(12) United States Patent
Iwasaki et al.

(10) Patent No.: US 7,132,176 B2
(45) Date of Patent: Nov. 7, 2006

(54) PERPENDICULAR MAGNETIC RECORDING MEDIUM AND MAGNETIC RECORDING/REPRODUCTION APPARATUS

(75) Inventors: Takeshi Iwasaki, Funabashi (JP); Takashi Hikosaka, Tokyo (JP); Soichi Oikawa, Chiba (JP); Futoshi Nakamura, Ichikawa (JP); Hiroshi Sakai, Ichihara (JP); Kenji Shimizu, Ichihara (JP); Akira Sakawaki, Ichihara (JP)

(73) Assignees: Kabushiki Kaisha Toshiba, Tokyo (JP); Showa Denko K.K., Tokyo (JP)

( * ) Notice: Subject to any disclaimer, the term of this patent is extended or adjusted under 35 U.S.C. 154(b) by 68 days.

(21) Appl. No.: 10/626,837

(22) Filed: Jul. 25, 2003

(65) Prior Publication Data
US 2004/0137277 A1 Jul. 15, 2004

(30) Foreign Application Priority Data
Jul. 25, 2002 (JP) ............................. 2002-216595

(51) Int. Cl.
G11B 5/66 (2006.01)
(52) U.S. Cl. .................... 428/829; 428/836.2
(58) Field of Classification Search .................. None
See application file for complete search history.

(56) References Cited

U.S. PATENT DOCUMENTS

| 5,236,791 | A | * | 8/1993 | Yahisa et al. | .......... 428/694 TP |
| 5,478,661 | A | * | 12/1995 | Murayama et al. | ...... 428/836.3 |
| 5,665,468 | A | | 9/1997 | Sekiya et al. | |
| 5,679,473 | A | * | 10/1997 | Murayama et al. | ...... 428/836.3 |
| 5,792,564 | A | * | 8/1998 | Hikosaka et al. | ............ 428/610 |
| 5,851,643 | A | * | 12/1998 | Honda et al. | ............... 428/212 |
| 2002/0018917 | A1 | * | 2/2002 | Sakai et al. | .......... 428/694 TM |
| 2003/0064249 | A1 | * | 4/2003 | Uwazumi et al. | ...... 428/694 BA |
| 2003/0082407 | A1 | * | 5/2003 | Sakawaki et al. | ...... 428/694 BA |

FOREIGN PATENT DOCUMENTS

| EP | 0 770 996 A2 | | 5/1997 |
| JP | 02-103715 A | * | 4/1990 |
| JP | 5-54358 | | 3/1993 |
| JP | 9-91660 | | 4/1997 |
| JP | 2000-67401 | | 3/2000 |
| JP | 2001-76332 | | 3/2001 |
| JP | 2002-25031 | | 1/2002 |
| JP | 2003-067910 A | * | 3/2003 |

OTHER PUBLICATIONS

JPO Abstract Translation of JP 2003-067910 A (JPO Pat No. JP02003067910A).*
Derwent Abstract Translation of JP 2001-076332 A (Derwent Acc. No. 2001-312209).*
Derwent Abstract Translation of JP 05-054358 A (Derwent Acc. No. 1993-113730).*
Derwent Abstract Translation of JP 02-103715 A (Derwent Acc. No. 1990-160864).*

(Continued)

Primary Examiner—Kevin M. Bernatz
(74) Attorney, Agent, or Firm—Pillsbury Winthrop Shaw Pittman, LLP

(57) ABSTRACT

A perpendicular magnetic recording medium includes a magnetic recording layer stacked on a substrate and having a first perpendicular magnetic recording layer containing cobalt, and a second perpendicular magnetic recording layer mainly containing a crystalline alloy which contains a rare earth element and a transition metal.

18 Claims, 4 Drawing Sheets

OTHER PUBLICATIONS

JPO Abstract Translation of JP 2002-025031 A (Pat-No. JP02002025031A).*

Japanese Office Action for Japanese Patent Application No. 2002-216595, dated Sep. 14, 2004.

U.S. Appl. No. 10/218,570, filed Aug. 15, 2002, Shimizu et al.

U.S. Appl. No. 10/234,719, filed Sep. 5, 2002, Hikosaka et al.

Austrian Patent Office Search Report dated Sep. 10, 2004.

* cited by examiner

PERPENDICULAR MAGNETIC RECORDING MEDIUM AND MAGNETIC RECORDING/REPRODUCTION APPARATUS

CROSS-REFERENCE TO RELATED APPLICATIONS

This application is based upon and claims the benefit of priority from the prior Japanese Patent Application No. 2002-216595, filed Jul. 25, 2002, the entire contents of which are incorporated herein by reference.

BACKGROUND OF THE INVENTION

1. Field of the Invention

The present invention relates to a magnetic recording/reproduction apparatus used as a hard disk apparatus and, more particularly, to a magnetic recording/reproduction apparatus using perpendicular magnetization and a perpendicular magnetic recording medium for use in the apparatus.

2. Description of the Related Art

An amorphous rare earth element-transition metal alloy magnetic layer having perpendicular magnetic anisotropy is generally used as a recording layer of a magnetooptical recording medium.

Recently, the use of this amorphous rare earth element-transition metal alloy magnetic film as a perpendicular magnetic recording layer of a perpendicular magnetic recording medium such as a hard disk is proposed in, e.g., Jpn. Pat. Appln. KOKAI Publication Nos. 5-54358 and 2001-76332. However, the amorphous rare earth element-transition metal alloy magnetic layer is a continuous layer having no segregated structure, i.e., having neither magnetic crystal grains nor grain boundaries. Therefore, if this layer is used as a magnetic recording medium, there is no core for keeping a written signal in a written place. As a consequence, a recorded signal shifts or disappears. This phenomenon often occurs especially in high-frequency recording, so the amorphous rare earth element-transition metal alloy magnetic layer is unsuited to increasing the recording density of perpendicular magnetic recording.

Jpn. Pat. Appln. KOKAI Publication No. 2002-25031 discloses a perpendicular magnetic recording medium having a multilayered arrangement obtained by combining a material such as CoCr used in the conventional magnetic recording medium and the amorphous rare earth element-transition metal alloy magnetic layer. Unfortunately, even this medium has the problem that the medium noise is larger than in the conventional recording medium using a CoCr recording layer.

As described above, a perpendicular magnetic recording layer using the conventional rare earth element-transition metal alloy magnetic layer is unsuitable to increasing the recording density and is unpractical because the medium noise is large.

BRIEF SUMMARY OF THE INVENTION

According to an embodiment of the present invention, there is provided a perpendicular magnetic recording medium characterized by comprising a nonmagnetic substrate, a first perpendicular magnetic recording layer formed on the nonmagnetic substrate, having an easy axis of magnetization in the vertical direction to the surface of the medium, and mainly containing cobalt, and a second perpendicular magnetic recording layer formed on the first perpendicular magnetic recording layer, having an easy axis of magnetization in the vertical direction to the surface of the medium, and mainly comprising a crystalline alloy which contains a rare earth element and a transition metal.

BRIEF DESCRIPTION OF THE SEVERAL VIEWS OF THE DRAWING

The accompanying drawings, which are incorporated in and constitute a part of the specification, illustrate presently embodiments of the invention and, together with the generation description given above and the detailed description of the embodiments given below, serve to explain the principles of the invention.

DETAILED DESCRIPTION OF THE INVENTION

Figure 1:
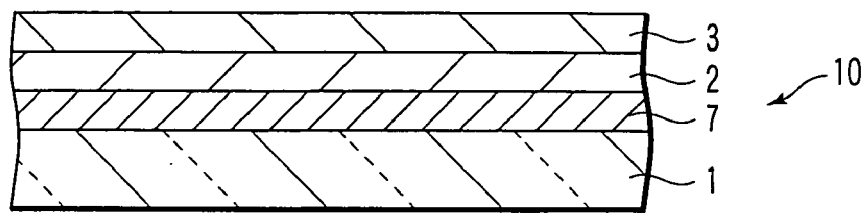
FIG. 1 is a schematic sectional view showing an example of a perpendicular magnetic recording medium of the present invention.

A perpendicular magnetic recording medium according to the first aspect of the present invention has an arrangement in which a first perpendicular magnetic recording layer having an easy axis of magnetization in the vertical direction to the surface of the medium, and a second perpendicular magnetic recording layer formed on the first perpendicular magnetic recording layer, having an easy axis of magnetization in the vertical direction to the surface of the medium are stacked in this order on a nonmagnetic substrate, in which the first perpendicular magnetic recording layer contains cobalt in a larger amount, the second perpendicular magnetic recording layer contains a crystalline alloy in a larger amount, and the crystalline alloy contains a rare earth element and a transition metal.

The first perpendicular magnetic recording layer mainly containing cobalt used in the present invention has a segregated structure having magnetic crystal grains and grain boundaries. On this recording layer, the second perpendicular magnetic recording layer mainly containing a crystalline alloy which contains a rare earth element and a transition metal is formed. According to the present invention, the size of the magnetic crystal grains growing from the first perpendicular magnetic recording layer is reduced, and the grain boundaries is extended, thereby the segregated structure is further promoted. Also, since the magnetic recording layer has this double layered structure, its magnetic anisotropy can be further increased compared to the conventional perpendicular magnetic recording medium having only one CoCr-based magnetic layer.

The present invention can achieve the following effects. First, the resolution of the perpendicular magnetic recording layers, particularly, the second perpendicular magnetic recording layer can be increased by downsizing the magnetic crystal grains in the layer. Second, the thermal decay resistance can be increased by promoting the magnetic anisotropy of the whole perpendicular magnetic recording layer. Third, the medium noise can be decreased by promoting the segregated structure of the perpendicular magnetic recording layers, particularly, the second magnetic recording layer.

If the content of the rare earth element is large in the alloy containing the rare earth element and the transition metal, the magnetic film often changes to an amorphous continuous film. Therefore, the present invention obtains a crystalline film by controlling, e.g., the addition amount of the rare earth element and the thickness of the magnetic layer.

A soft magnetic layer can be formed as a backing layer between the nonmagnetic substrate and first perpendicular magnetic recording layer.

This soft magnetic layer is made of a soft magnetic material having high magnetic permeability. Examples are CoZrNb, FeTaC, FeZrN, FeSi alloy, FeAl alloy, FeNi alloy such as Permalloy, FeCo-based alloy such as Permendur, FeCoNi alloy such as Perminvar, NiCo alloy, sendust, MnZn-based ferrite, NiZn-based ferrite, MgZn-based ferrite, MgMn-based ferrite, FeAlGa, FeCuNbSiB, FeGaGe, FeGeSi, FeNiPb, FeRuGaSi, FeSiB, FeSiC, FeZrB, FeZrBCu, CoFeSiB, CoTi, and CoZrTa.

When this high-magnetic-permeability soft magnetic layer is formed, a so-called double layered perpendicular recording medium having a perpendicular magnetic recording layer on the soft magnetic layer is formed. In this double layered perpendicular recording medium, the soft magnetic layer performs part of the function of a magnetic head for magnetizing the perpendicular magnetic recording layer. That is, a recording magnetic field supplied from the recording head to magnetize the perpendicular magnetic recording layer is moved in the horizontal direction and returned to the magnetic head by this soft magnetic layer. In this manner, the soft magnetic layer can increase the recording/reproduction efficiency.

In addition, a ferromagnetic layer can be formed between the soft magnetic layer and nonmagnetic substrate. After the medium is formed, a magnetic field is applied to this ferromagnetic layer in one radial direction, thereby applying a bias magnetic field to the soft magnetic layer and preventing the formation of magnetic domain walls.

Examples of the ferromagnetic layer are CoSm, CoPt, CoCrPt, and CoCrPtCu.

An undercoating such as Cr, V, or NiAl can also be formed between the soft magnetic layer and substrate.

On the obtained magnetic recording layer surface, a protective layer made of, e.g., carbon can be formed.

Furthermore, a lubricating layer can be formed by coating the perpendicular magnetic recording medium surface, e.g., the magnetic recording layer surface or protective layer surface, with a lubricating agent such as perfluoropolyether by dipping or the like.

FIG. 1 is a sectional view showing an example of the perpendicular magnetic recording medium of the present invention.

As shown in FIG. 1, a perpendicular magnetic recording layer 10 has an arrangement in which a soft magnetic backing layer 7, a first perpendicular magnetic recording layer 2 containing cobalt, and a second perpendicular magnetic recording layer 3 mainly containing a crystalline alloy which contains a rare earth element and a transition metal are stacked in this order on a nonmagnetic substrate 1 which is, e.g., a 2.5-inch glass substrate.

Examples of the transition metal used in the second perpendicular magnetic recording layer are cobalt and chromium.

Platinum can also be used as this transition metal.

Examples of the rare earth element used in the second perpendicular magnetic recording layer are yttrium, lanthanum, cerium, praseodymium, neodymium, samarium, europium, gadolinium, terbium, dysprosium, holmium, thulium, ytterbium, and lutetium.

The rare earth element can contain in an amount of 0.1 to 20 at % in the second perpendicular magnetic recording layer. If the content is less than 0.1 at %, the effect of reducing the size of the crystal grains by the addition of the rare earth element does not tend to appear. This tends to make the magnetic crystal grains and the noise larger than when 0.1 at % of the rare earth element is added. If the content exceeds 20 at %, the magnetic crystal grains tend to become an amorphous continuous film. Accordingly, the segregated structure of the second perpendicular magnetic recording layer tends to disappear, and the noise tends to increase.

The first perpendicular magnetic recording layer can contain at least one of platinum and chromium.

In this case, the second perpendicular magnetic recording layer can contain at least one element selected from the group consisting of yttrium, lanthanum, cerium, samarium, europium, thulium, ytterbium, and lutetium, and the content can be 0.1 to 20 at % in the second perpendicular magnetic recording layer. If the content is less than 0.1 at %, the effect by the addition of the rare earth element does not tend to appear. This makes the magnetic crystal grains and the noise larger than when 0.1 at % of the rare earth element is added. If the content exceeds 20 at %, the magnetic crystal grains tend to become an amorphous continuous film. Accordingly, the segregated structure of the second perpendicular magnetic recording layer tends to disappear, and the noise tends to increase.

Alternatively, the second perpendicular magnetic recording layer can contain at least one element selected from the group consisting of praseodymium, neodymium, gadolinium, terbium, dysprosium, and holmium, and the content can be 0.1 to 10 at % in the second perpendicular magnetic recording layer. If the content is less than 0.1 at %, the effect by the addition of the rare earth element does not tend to appear. This tends to make the magnetic crystal grains and the noise larger than when 0.1 at % of the rare earth element is added. If the content exceeds 10 at %, the magnetic crystal grains tend to become an amorphous continuous film. Accordingly, the segregated structure of the second perpendicular magnetic recording layer tends to disappear, and the noise tends to increase.

The first perpendicular magnetic recording layer can further contain oxygen in addition to at least one of platinum and chromium.

In this case, the rare earth element can be at least one element selected from the group consisting of yttrium, lanthanum, cerium, praseodymium, neodymium, samarium, europium, gadolinium, terbium, dysprosium, holmium, thulium, ytterbium, and lutetium, and the content can be 0.1 to 20 at % in the second perpendicular magnetic recording layer. If the content is less than 0.1 at %, the effect by the addition of the rare earth element cannot be achieved. This makes the magnetic crystal grains and the noise larger than when 0.1 at % of the rare earth element is added. If the content exceeds 20 at %, the magnetic crystal grains tend to become an amorphous continuous film. Accordingly, the segregated structure of the second perpendicular magnetic recording layer tends to disappear, and the noise tends to increase.

At least one of Ta and Nb can be added to the alloy contained in the second perpendicular magnetic recording layer. By the addition of Ta and Nb, the segregated structure further tends to advance to reduce the noise.

The addition amount of Ta and Nb can be 0.1 to 20 at % in the second perpendicular magnetic recording layer. If the addition amount is less than 0.1 at %, the effect by the addition of Ta and Nb does not tend to appear, and the noise reducing effect tends to be smaller than that of the medium to which these metals are added. If the addition amount exceeds 20 at %, excess Ta and Nb disturb the crystallinity, and the resolution significantly worsens.

The thickness of the second perpendicular magnetic recording layer can be 0.1 (inclusive) to 20 (exclusive) nm, and preferably, 0.1 (inclusive) to 15 (inclusive) nm. If the thickness is less than 0.1 nm, the effect of the second perpendicular magnetic recording layer does not appear. In this case, the magnetic crystal grains and the noise are larger than when the thickness is 0.1 nm or more. If the thickness is 20 nm or more, the crystallinity in the second perpendicular magnetic recording layer tends to deteriorate and to reduce the resolution.

As the material of the first perpendicular magnetic recording layer, it is possible to use, e.g., CoPt, CoCr, CoCrPt, CoCrO, CoPtO, CoPtCrO, CoCrPtB, CoCrPtTa, CoCrPtW, CoCrPtMo, CoCrPtCu, CoCrPtRu, CoCrPtWC, CoCrPt RuC, CoCrPtCuB, CoCrPtCuB, CoCrPtWB, CoCrPtTaCu, CoCrPtTaW, CoPt-SiO$_2$, and CoPtSiO.

The thickness of the first perpendicular magnetic recording layer can be 1 to 30 nm, and preferably, 5 to 20 nm. If the thickness is less than 1 nm, the segregated structure does not tend to well appear, so the noise tends to increase. If the thickness exceeds 30 nm, the size of the magnetic crystal grains tends to increase, and the resolution tends to worsen.

Two or more layers including the second perpendicular magnetic recording layer can be stacked on the first perpendicular magnetic recording layer.

Figure 2:
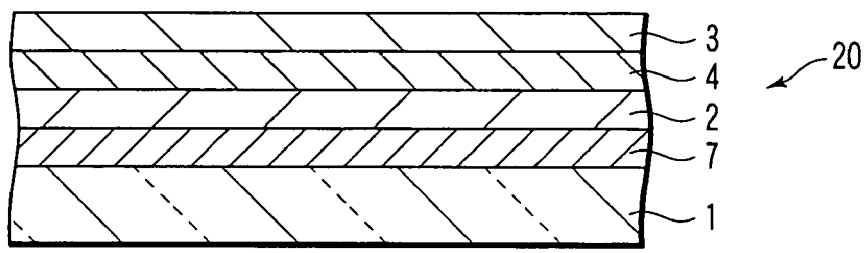
FIG. 2 is a schematic sectional view showing the arrangement of another example of the perpendicular magnetic recording medium of the present invention.

FIG. 2 is a sectional view showing the arrangement of another example of the perpendicular magnetic recording medium of the present invention.

As shown in FIG. 2, a perpendicular magnetic recording medium 20 has the same arrangement as FIG. 1 except that a magnetic layer 4 made of, e.g., CoCrPtB is formed between first and second perpendicular magnetic recording layers 2 and 3.

Also, the first and second perpendicular magnetic recording layers can be alternately stacked on a nonmagnetic substrate.

Figure 3:
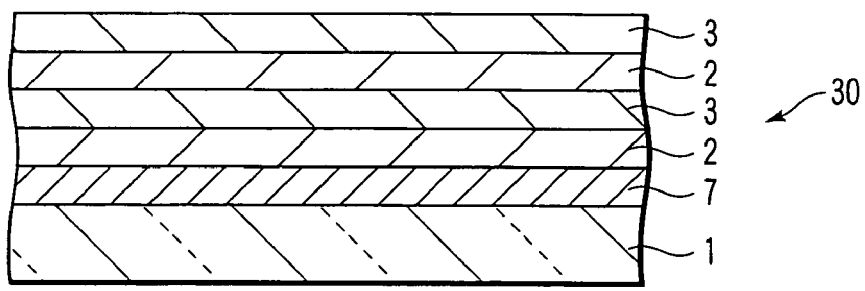
FIG. 3 is a schematic sectional view showing the arrangement of still another example of the perpendicular magnetic recording medium of the present invention.

FIG. 3 is a sectional view showing the arrangement of still another example of the perpendicular magnetic recording medium of the present invention.

As shown in FIG. 3, a perpendicular magnetic recording medium 30 has the same arrangement as FIG. 1 except that first and second perpendicular magnetic recording layers 2 and 3 are formed on other first and second perpendicular magnetic recording layers 2 and 3, thereby alternately stacking the first and second perpendicular magnetic recording layers on a nonmagnetic substrate.

If two or more magnetic recording layers including the second perpendicular magnetic recording layer are stacked on the first perpendicular magnetic recording layer, the thickness of the whole magnetic recording layer can be 5 to 30 nm. If the thickness is less than 5 nm, the initial layer having inferior crystallinity tends to occupy a large portion of the entire magnetic recording layer to worsen the resolution. If the thickness exceeds 30 nm, the size of the magnetic crystal grains tends to increase and the noise tends to increase.

An arbitrary interlayer can be formed between the first and second perpendicular magnetic recording layers and each magnetic layer. Examples of the interlayer are Cr, Mo, W, CrMo, CrW, CoCr, CoCrPt, and CoCrPtB. When this interlayer is formed, a segregation source can be supplied from the interlayer, so the segregated structure can be promoted.

The thickness of this interlayer can be 0.1 to 5 nm. If the thickness is less than 0.1 nm, the segregated structure promoting effect by the interlayer does not appear. If the thickness exceeds 5 nm, the crystallinity of the upper magnetic recording layer tends to disturb, and the resolution tends to worsen.

An arbitrary nonmagnetic undercoating or the like can be formed between the nonmagnetic substrate or the soft magnetic backing layer and the first perpendicular magnetic recording layer.

As this undercoating, it is possible to use, e.g., Ti, TiCr, Ru, RuCr, Hf, NiAl, NiTa, NiNb, CoCrPt, and CoCrPtB.

The thickness of the nonmagnetic undercoating used in the present invention can be 1 to 50 nm, and preferably, 5 to 30 nm. If the thickness is less than 1 nm, the crystallinity of the nonmagnetic undercoating tends to worsen. Accordingly, the crystallinity of the magnetic recording layer also tends to worsen, and the noise tends to increase. If the thickness exceeds 50 nm, the size of the magnetic crystal grains in the magnetic recording layer tends to increase, and the noise tends to increase.

Figure 4:
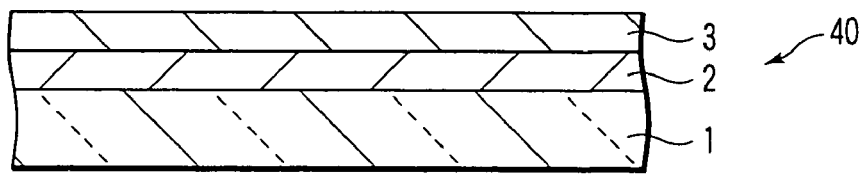
FIG. 4 is a schematic sectional view showing the arrangement of still another example of the perpendicular magnetic recording medium of the present invention.

FIG. 4 is a schematic sectional view showing the arrangement of still another example of the perpendicular magnetic recording medium of the present invention.

As shown in FIG. 4, a perpendicular magnetic recording medium 40 has the same arrangement as FIG. 1 except that no soft magnetic backing layer 7 is formed.

An improvement of the resolution of this perpendicular magnetic recording medium can be not expected because this perpendicular magnetic recording medium is not a so-called double-layered perpendicular medium that comprises a perpendicular magnetic recording layer on a soft magnetic backing layer. However, similar to the perpendicular magnetic recording medium according to the first aspect, it is possible to increase the resolution of the second perpendicular magnetic recording layer by reducing the size of the magnetic crystal grains in this layer, increase the thermal decay resistance by promoting the magnetic anisotropy of the whole perpendicular magnetic recording layer, and reduce the medium noise by promoting the segregated structure of the magnetic recording layers, particularly, the second magnetic recording layer.

A magnetic recording/reproduction apparatus according to the second aspect of the present invention comprises a perpendicular magnetic recording medium, a mechanism which supports and rotates the perpendicular magnetic recording medium, a magnetic head having an element to record information on the perpendicular magnetic recording medium and an element to reproduce recorded information, and a carriage assembly which supports the magnetic head to be movable with respect to the perpendicular magnetic recording medium, in which the perpendicular magnetic recording medium comprises a nonmagnetic substrate, a first perpendicular magnetic recording layer formed on the nonmagnetic substrate, having an easy axis of magnetization in the vertical direction to the surface of the medium, and a second perpendicular magnetic recording layer formed on the first perpendicular magnetic recording layer, having an easy axis of magnetization in the vertical direction to the surface of the medium, the first perpendicular magnetic recording layer mainly containing cobalt, the second perpendicular magnetic recording layer mainly comprising a crystalline alloy which contains a rare earth element and a transition metal.

Figure 5:
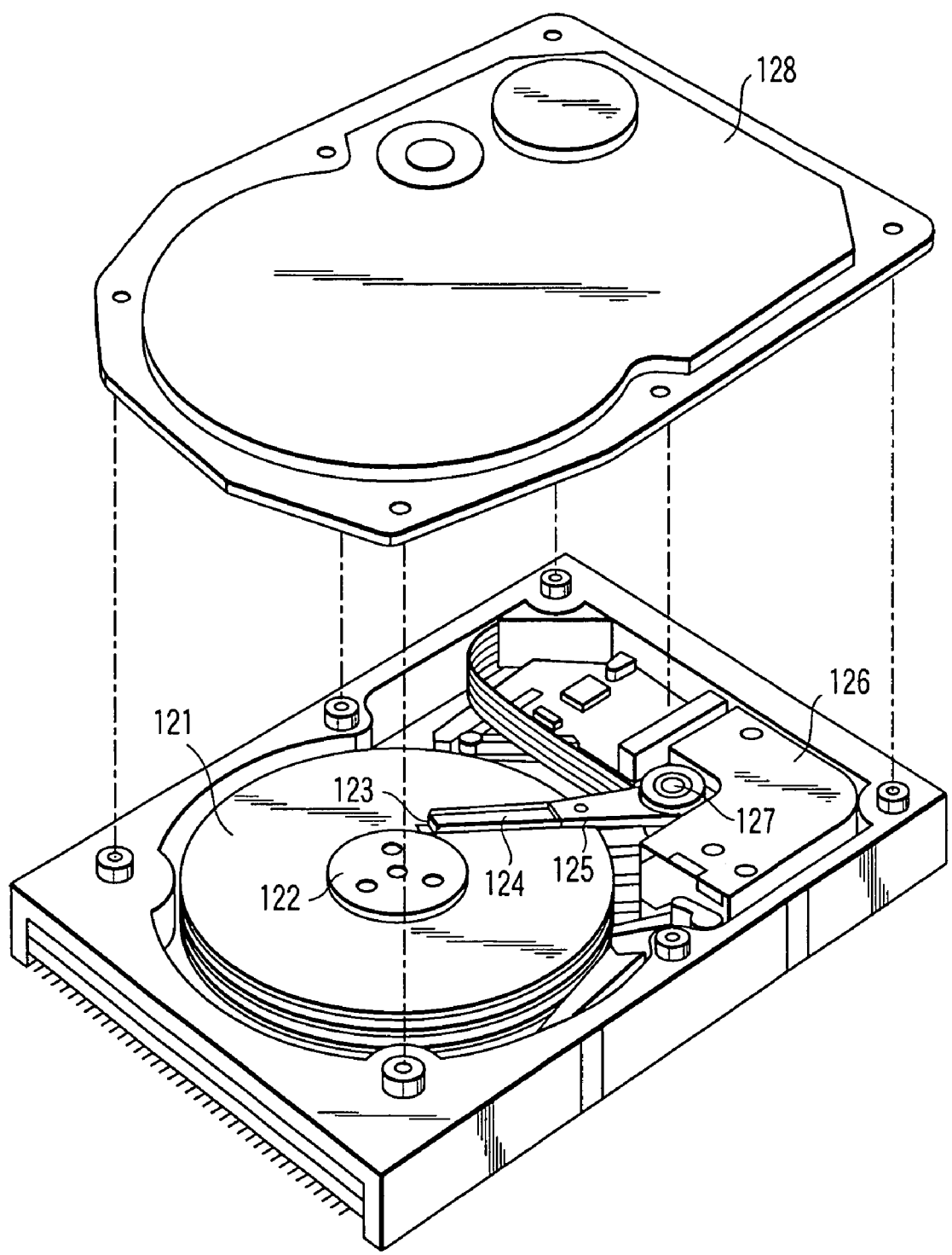
FIG. 5 is a perspective view showing an example of a magnetic recording/reproduction apparatus of the present invention.

FIG. 5 is a partially exploded perspective view showing an example of the magnetic recording/reproduction apparatus according to the present invention.

A rigid magnetic disk 121 for recording information according to the present invention is fitted on a spindle 122 and rotated at a predetermined rotational speed by a spindle motor (not shown). A slider 123 mounting a single pole recording head for accessing the magnetic disk 121 to record information and an MR head for reproducing information is attached to the end portion of a suspension 124 which is a thin leaf spring. This suspension 124 is connected to one end of an arm 125 having, e.g., a bobbin which holds a driving coil (not shown).

A voice coil motor 126 as a kind of a linear motor is attached to the other end of the arm 125. This voice coil motor 126 includes the driving coil (not shown) wound around the bobbin of the arm 125, and a magnetic circuit having a permanent magnetic and counter yoke opposing each other on the two sides of the driving coil.

The arm 125 is held by ball bearings (not shown) formed in two, upper and lower portions of a fixed shaft 127, and pivoted by the voice coil motor 126. That is, the position of the slider 123 on the magnetic disk 121 is controlled by the voice coil motor 126. Reference numeral 128 in FIG. 5 denotes a lid.

The present invention will be described in more detail below by way of its examples.

EXAMPLE 1

A nonmagnetic substrate made of a 2.5-inch magnetic disk glass substrate was prepared.

This nonmagnetic substrate was placed in a vacuum chamber having a vacuum degree of $1 \times 10^{-5}$ Pa, the substrate temperature was raised to 250° C., and DC magnetron sputtering was performed in an Ar ambient at a gas pressure of 0.6 Pa.

First, the nonmagnetic substrate was opposed to a target, and discharge was performed on the target at DC 500 W, thereby forming a 40-nm thick Cr film as a nonmagnetic undercoating for forming a ferromagnetic layer. On top of this Cr film, a 25-nm thick CoCrPt ferromagnetic layer was formed. On the obtained CoCrPt ferromagnetic layer, a 200-nm thick CoZrNb soft magnetic backing layer was formed.

Subsequently, on the CoZrNb soft magnetic backing layer, a 5-nm thick Ti layer was formed as a first undercoating by performing discharge on a Ti target at DC 300 W. On the obtained Ti layer, a 20-nm thick nonmagnetic CoCrPt layer was formed by performing discharge on a Co-37 at % Cr-8 at % Pt target at DC 500 W.

After that, a Co-20 at % Cr-16 at % Pt target was prepared, and a 15-nm thick CoCrPt perpendicular magnetic recording layer was formed as a first perpendicular magnetic recording layer on the nonmagnetic CoCrPt undercoating.

A Co-20 at % Cr-15 at % Ce target was then used to form a 9-nm thick CoCrCe perpendicular magnetic recording layer as a second perpendicular magnetic recording layer on the CoCrPt perpendicular magnetic recording layer.

Finally, a 7-nm thick carbon protective layer was formed to obtain a perpendicular magnetic recording medium.

After the substrate thus continuously sputtered in the vacuum chamber was taken out into the atmosphere, a 1.5-nm thick perfluoropolyether(PFPE)-based lubricating layer was formed by dipping, thereby obtaining a perpendicular magnetic recording medium.

Figure 6:
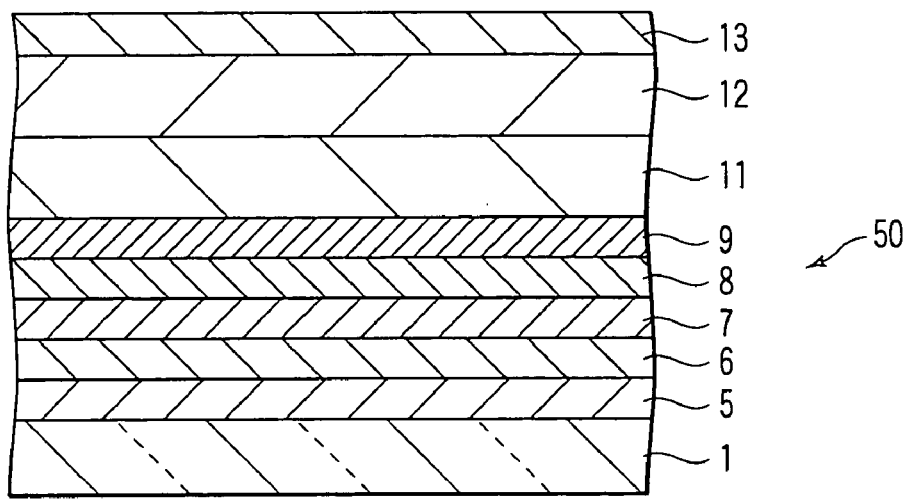
FIG. 6 is a schematic sectional view showing the arrangement of a perpendicular magnetic recording medium according to Example 1.

FIG. 6 is a sectional view showing the arrangement of the perpendicular magnetic recording medium according to Example 1.

As shown in FIG. 6, a perpendicular magnetic recording medium 50 has a structure in which a Cr nonmagnetic layer 5, CoCrPt ferromagnetic layer 6, CoZrNb soft magnetic film 7, Ti first undercoating 8, CoCrPt second undercoating 9, CoCrPt perpendicular magnetic recording layer 11, CoCrCe perpendicular magnetic recording layer 12, C protective layer 13, and lubricating layer (not shown) are stacked in this order on a nonmagnetic substrate 1.

The crystallinity of the CoCrCe perpendicular magnetic recording layer as the second perpendicular magnetic recording layer of the obtained perpendicular magnetic recording medium was checked as follows.

For comparison, a perpendicular magnetic recording medium was formed following the same procedure as in Example 1 except that no CoCrCe second perpendicular magnetic recording layer was formed.

Figure 7:
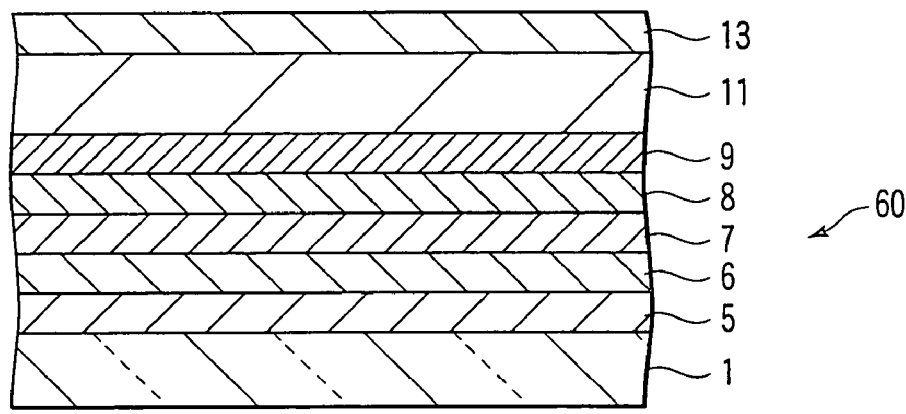
FIG. 7 is a schematic sectional view showing the arrangement of a conventional perpendicular magnetic recording medium.

FIG. 7 is a sectional view showing the arrangement of this perpendicular magnetic recording layer for comparison. As shown in FIG. 7, a perpendicular magnetic recording medium 60 has a structure in which a Cr nonmagnetic undercoating 5, CoCrPt ferromagnetic layer 6, CoZrNb soft magnetic layer 7, Ti first undercoating 8, CoCrPt second undercoating 9, CoCrPt perpendicular magnetic recording layer 11, C protective layer 12, and lubricating layer (not shown) are stacked in this order on a nonmagnetic substrate 1.

X-ray diffraction measurement was performed for the obtained perpendicular magnetic recording media 50 and 60 to measure the Co (0002) peak intensity of the perpendicular magnetic recording layer. In the Co (0002) peak intensity of the perpendicular magnetic recording medium 40, overlapped signals from both Co in the CoCrPt first perpendicular magnetic recording layer and Co in the CoCrCe second perpendicular magnetic recording layer were observed. Therefore, X-ray diffraction measurement was performed for the perpendicular magnetic recording medium 50 to observe the Co (0002) peak intensity from the CoCrPt first perpendicular magnetic recording layer. The Co (0002) peak intensity of the CoCrCe second perpendicular magnetic recording layer was checked by calculating the Co (0002)

peak intensity difference between these two perpendicular magnetic recording media. Consequently, the Co (0002) peak intensity was clearly 100 cps or more, indicating that the CoCrCe second perpendicular magnetic recording layer was crystalline, not amorphous.

A magnetic field of 15 kOe (about $1.2 \times 10^6$ A/m) was applied outward in the radial direction of the disk substrate of the perpendicular magnetic recording medium 40 by using a magnetizing apparatus having an electromagnet, thereby magnetizing, in the radial direction, the CoCrPt ferromagnetic layer exhibiting longitudinal hard magnetism. The magnetoresistance effect of the magnetized perpendicular magnetic recording medium was used to evaluate the recording/reproduction characteristics by using a single pole head having a recording track width of 0.3 µm and a reproduction track width of 0.2 µm. As a result, a differential waveform half width dPW50 as an index of the resolution was 89 nm, and SNRm (S: low-frequency output, N: noise at 400 kFCI) was 23.9 dB, indicating that the medium was excellent. In addition, the decay value at a low-frequency output of 50 kFCI as a thermal decay index was −0.05%/decade. Table 1 shows the obtained results of dPW50 and SNRm.

Comparative Example 1

A perpendicular magnetic recording medium was obtained following the same procedure as in Example 1 except that a 24-nm thick CoCrPt layer was formed as a first perpendicular magnetic recording layer on a nonmagnetic substrate similar to that of Example 1, and no CoCrCe layer as a second perpendicular magnetic recording layer was formed.

The recording/reproduction characteristics of the obtained perpendicular magnetic recording medium were evaluated in the same manner as in Example 1. The dPW50 as an index of the resolution was 105 nm, and the SNRm was 17.1 dB. Also, the decay value at a low-frequency output of 50 kFCI was −0.15%/decade. Table 1 shows the obtained results of the dPW50 and SNRm.

Comparative Example 2

A perpendicular magnetic recording medium was obtained following the same procedure as in Example 1 except that on a nonmagnetic substrate similar to that of Example 1, a 9-nm thick CoCrCe layer as a second perpendicular magnetic recording layer was formed by using a Co-20 at % Cr-15 at % Ce target, and a 15-nm thick CoCrPt layer as a first perpendicular magnetic recording layer was formed by using a Co-20 at % Cr-16 at % Pt target.

Figure 8:
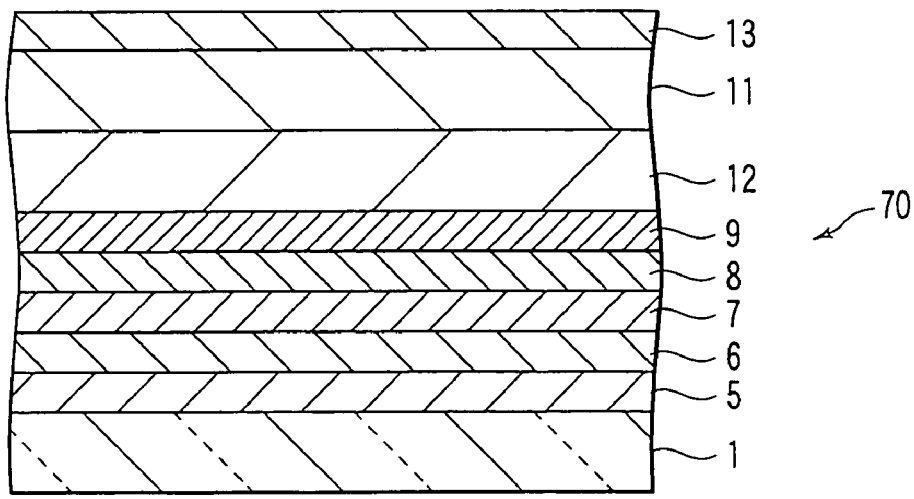
FIG. 8 is schematic sectional view showing the arrangement of a perpendicular magnetic recording medium according to Comparative Example 2.

FIG. 8 is a sectional view showing the arrangement of the perpendicular magnetic recording medium according to Comparative Example 2.

As shown in FIG. 8, a perpendicular magnetic recording medium 70 has a structure in which a Cr nonmagnetic layer 5, CoCrPt ferromagnetic layer 6, CoZrNb soft magnetic layer 7, Ti first undercoating 8, CoCrPt second undercoating 9, CoCrCe perpendicular magnetic recording layer 12, CoCrPt perpendicular magnetic recording layer 11, C protective layer 13, and lubricating layer (not shown) are stacked in this order on a nonmagnetic substrate 1.

The recording/reproduction characteristics of the obtained perpendicular magnetic recording medium 70 were evaluated in the same manner as in Example 1. As a consequence, the dPW50 was 115 nm, and the SNRm was 15.2 dB. Also, the decay value at a low-frequency output of 50 kFCI was −0.11%/decade. Table 1 below shows the obtained results of the dPW50 and SNRm.

TABLE 1

|  | First magnetic layer | Second magnetic layer | SNRm (dB) | dPW50 nm |
|---|---|---|---|---|
| Example 1 | CoCrPt | CoCrCe | 23.9 | 89 |
| Comparative Example 1 | CoCrPt | CoCrPt | 17.1 | 105 |
| Comparative Example 2 | CoCrCe | CoCrPt | 15.2 | 115 |

EXAMPLE 2

A plurality of different perpendicular magnetic recording media having second perpendicular magnetic recording layers different in thickness were formed following the same procedure as in Example 1 except that cerium was used and the film thickness of cerium was properly changed from 0 to 30 nm.

Table 2 below shows the relationship between the SNRm and the film thickness of the second magnetic layer.

TABLE 2

| Thickness of second magnetic layer | SNRm (dB) |
|---|---|
| 0 | 17.6 |
| 0.1 | 17.9 |
| 0.5 | 18.7 |
| 1 | 21.1 |
| 5 | 23.1 |
| 9 | 23.9 |
| 10 | 23.8 |
| 15 | 23.8 |
| 20 | 19.9 |
| 25 | 19.5 |
| 30 | 18.7 |

As shown in the Table 2, the effect of increasing the SNRm was obtained when the thickness of the second magnetic recording layer was 0.1 to 20 nm. The thickness of the second magnetic recording layer can be 1 to 15 nm.

EXAMPLE 3

A perpendicular magnetic recording medium was obtained following the same procedure as in Example 1 except that a 9-nm thick CoCrPtCe layer was formed as a second perpendicular magnetic recording layer by using a Co-20 at % Cr-14 at % Pt-9 at % Ce target.

The recording/reproduction characteristics of the obtained perpendicular magnetic recording medium were evaluated in the same manner as in Example 1. Consequently, dPW50=85 nm and SNRm=24.2 dB, i.e., the medium had good characteristics. Also, the decay value at a low-frequency output of 50 kFCI was −0.06%/decade.

EXAMPLE 4

A perpendicular magnetic recording medium was obtained following the same procedure as for the perpendicular magnetic recording medium 50 of Example 1 except that a 9-nm thick CoCrPtCeTa layer was formed as a second perpendicular magnetic recording layer by using a Co-20 at % Cr-14 at % Pt-9 at % Ce-2 at % Ta target.

The recording/reproduction characteristics of the obtained perpendicular magnetic recording medium were evaluated in the same manner as in Example 1. Consequently, dPW50=83 nm and SNRm=24.4 dB, i.e., the medium had good characteristics. Similar effects were obtained by a perpendicular magnetic recording medium using a 9-nm thick CoCrPtCeNb layer instead of the CoCrPtCeTa layer. Also, the decay value at a low-frequency output of 50 kFCI was −0.04%/decade.

EXAMPLE 5

A plurality of perpendicular magnetic recording media having Co-20 at % Cr—Ce layers different in composition ratio as second perpendicular magnetic recording layers were formed following the same procedure as in Example 1 except that cerium was used as a rare earth element in the second perpendicular magnetic recording layers, and the cerium composition of a Co-20 at % Cr—Ce target was properly changed from 0 to 25 at %.

Figure 9:
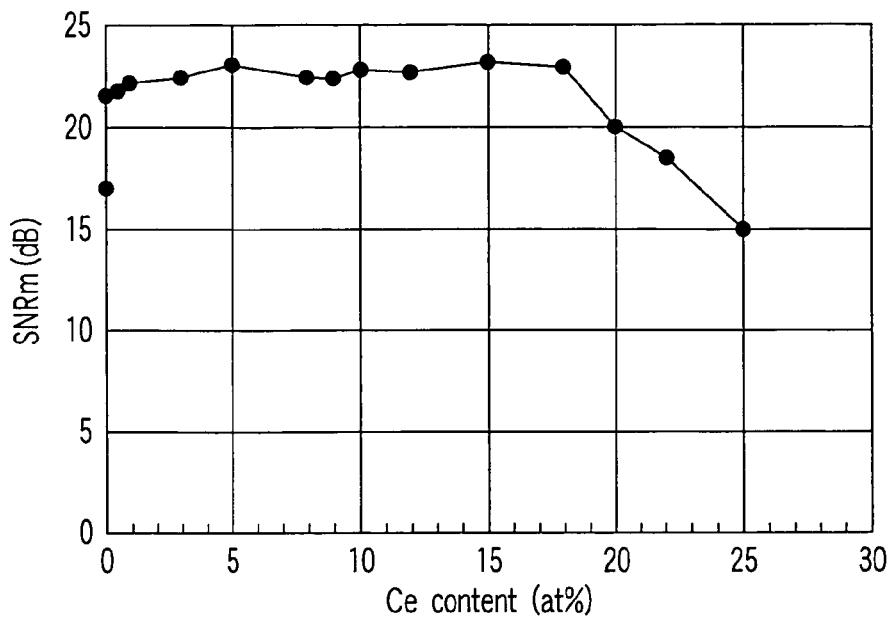
FIG. 9 is a graph showing the relationship between the cerium content and the SNRm.

The recording/reproduction characteristics of the obtained perpendicular magnetic recording medium were evaluated in the same manner as in Example 1. FIG. 9 is a graph showing the relationship between the cerium content and the SNRm as a result of the evaluation. This graph shown in FIG. 9 indicates that the SNRm was good when the cerium composition was 0.1 to 20 (exclusive) at %. Also, the Co (0002) intensity of the perpendicular magnetic recording layer of each of these perpendicular magnetic recording media was observed by X-ray diffraction measurement in the same manner as in Example 1. As a consequence, the Co (0002) intensity was clearly observed. Similar effects were obtained from perpendicular magnetic recording media using yttrium, lanthanum, thulium, ytterbium, and lutetium, instead of cerium.

EXAMPLE 6

A plurality of perpendicular magnetic recording media having Co-20 at % Cr—Gd layers different in composition were formed following the same procedure as in Example 5 except that gadolinium was used as a rare earth element, and the gadolinium composition of a Co-20 at % Cr—Gd target was properly changed from 0 to 25 at %.

Figure 10:
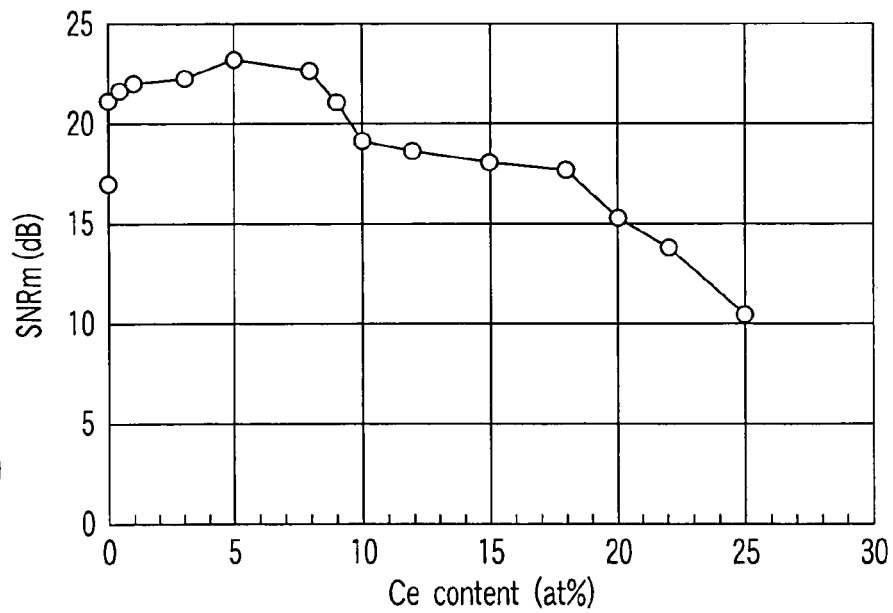
FIG. 10 is a graph showing the relationship between the gadolinium content and the SNRm.

The recording/reproduction characteristics of the obtained perpendicular magnetic recording medium were evaluated in the same manner as in Example 5. FIG. 10 is a graph showing the relationship between the gadolinium content and the SNRm as a result of the evaluation.

This graph shown in FIG. 10 indicates that the SNRm was good when the gadolinium composition was 0.1 to 10 (exclusive) at %. Also, the Co (0002) intensity of the perpendicular magnetic recording layer of each of these perpendicular magnetic recording media was observed by X-ray diffraction measurement in the same manner as in Example 5. As a consequence, the Co (0002) intensity was clearly observed. Similar effects were obtained from perpendicular magnetic recording media using praseodymium, samarium, europium, terbium, dysprosium, and holmium, instead of gadolinium.

EXAMPLE 7

Following the same procedure as in Example 1, a CoCrPt ferromagnetic layer and CoZrNb soft magnetic backing layer were formed on a nonmagnetic substrate.

This substrate was cooled to decrease the substrate temperature to room temperature. Subsequently, on the CoZrNb soft magnetic backing layer, Ti was discharged at DC 300 W to form a 4-nm thick Ti layer as a first undercoating. On this Ti layer, Co-37 at % Cr-8 at % Pt was discharged as a second undercoating at DC 500 W, thereby forming a 20-nm thick nonmagnetic CoCrPt layer.

After that, a Co-20 at % Pt-16 at % Cr target was used to form a 15-nm thick CoPtCrO perpendicular magnetic recording layer on the CoCrPt layer in an oxygen-containing argon ambient. Subsequently, a Co-20 at % Cr-15 at % Ce target was used to form a 9-nm CoCrCe perpendicular magnetic recording layer.

Finally, a 7-nm thick C protective layer was formed on the CoCrCe perpendicular magnetic recording layer.

After the substrate on which the films were thus continuously formed in a vacuum chamber was taken out into the atmosphere, a 1.5-nm thick PFPE-based lubricating layer was formed by dipping, thereby obtaining a perpendicular magnetic recording medium.

The obtained perpendicular magnetic recording medium had the same arrangement as Example 1 except that the CoPtCrO perpendicular magnetic recording layer was formed instead of the CoCrPt perpendicular magnetic recording layer.

The recording/reproduction characteristics of the obtained perpendicular magnetic recording medium were evaluated in the same manner as in Example 1. As a consequence, SNRm=23.0 dB, indicating that the medium was excellent. Also, the dPW50 was 82 nm, and the decay value at a low-frequency output of 50 kFCI was −0.07%/decade.

Similar effects were obtained from perpendicular magnetic recording media using yttrium, lanthanum, praseodymium, neodymium, samarium, europium, gadolinium, terbium, dysprosium, holmium, thulium, ytterbium, and lutetium, instead of cerium.

Table 3 below shows the obtained results of the dPW50 and SNRm.

TABLE 3

| Second magnetic layer | SNRm (dB) | dPW50 (nm) |
|---|---|---|
| CoCrY | 22.5 | 90 |
| CoCrLa | 22.1 | 92 |
| CoCrCe | 23.0 | 93 |
| CoCrPr | 23.7 | 91 |
| CoCrNd | 22.6 | 92 |
| CoCrSm | 22.3 | 96 |
| CoCrEu | 22.6 | 94 |
| CoCrGd | 23.6 | 90 |
| CoCrTb | 21.1 | 85 |
| CoCrDy | 21.4 | 87 |
| CoCrHo | 20.9 | 89 |
| CoCrTm | 21.2 | 88 |
| CoCrYb | 20.4 | 84 |
| CoCrLu | 21.1 | 86 |
| CoCrPt | 16.8 | 111 |

Table 3 shows that the SNRm improves when light rare earth elements such as yttrium, lanthanum, cerium, praseodymium, neodymium, samarium, europium, and gadolinium are used as rare earth elements. On the other hand, the resolution dPW50 rather than the SNRm, improves when heavy rare earth elements such as terbium, dysprosium, holmium, thulium, ytterbium, and lutetium are used as rare earth elements.

Comparative Example 3

A perpendicular magnetic recording medium was obtained following the same procedure as in Example 7 except that a CoCrPt layer was formed instead of the CoCrCe layer as a second perpendicular magnetic recording layer by using a Co-20 at % Cr-16 at % Pt target.

The recording/reproduction characteristics of the obtained conventional perpendicular magnetic recording medium were evaluated in the same manner as in Example 1. As a consequence, the SNRm was 16.8 dB. Also, the dPW50 was 96 nm, and the decay value at a low-frequency output of 50 kFCI was −0.17%/decade.

Comparative Example 4

A perpendicular magnetic recording medium was obtained following the same procedure as in Example 7 except that a Co-20 at % Pt-16 at % Cr target was used to form a 24-nm thick CoPtCrO layer as a first perpendicular magnetic recording layer in an oxygen-containing argon ambient, and no CoCrCe layer was formed as a second perpendicular magnetic recording layer.

The recording/reproduction characteristics of the obtained perpendicular magnetic recording medium were evaluated in the same manner as in Example 1. As a consequence, the SNRm was 17.3 dB. Also, the dPW50 was 98 nm, and the decay value at a low-frequency output of 50 kFCI was −0.12%/decade.

EXAMPLE 8

A perpendicular magnetic recording medium was formed following the same procedure as in Example 1 except that discharge was performed at DC 300 W on a first perpendicular magnetic recording layer target made of Co-20 at % Cr-16 at % Pt and a second perpendicular magnetic recording layer made of Co-20 at % Cr-15 at % Ce, thereby alternately forming three 5-nm thick first perpendicular magnetic recording layers and three 5-nm thick second perpendicular magnetic recording layers, i.e., forming a total of 30 nm of layers.

The recording/reproduction characteristics of the obtained perpendicular magnetic recording medium were evaluated in the same manner as in Example 1. Consequently, dPW50=80 nm and SNRm=22 dB, i.e., the medium had good characteristics. Also, the decay value at a low-frequency output of 50 kFCI was −0.04%/decade.

EXAMPLE 9

Figure 11:
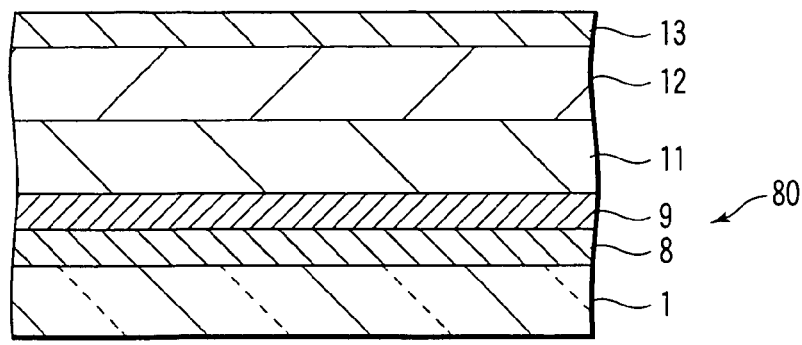
FIG. 11 is a schematic sectional view showing the arrangement of a perpendicular magnetic recording medium according to Example 9.

A perpendicular magnetic recording medium was formed following the same procedure as in Example 1 except that none of the nonmagnetic Cr undercoating 5, CoCrPt ferromagnetic backing layer 6, and CoZrNb soft magnetic backing layer 7 was formed. FIG. 11 shows the arrangement of this perpendicular magnetic recording medium according to Example 9. As shown in FIG. 11, a perpendicular magnetic recording medium 70 has an arrangement in which a Ti first undercoating 8, CoCrPt second undercoating 9, CoCrPt first perpendicular magnetic recording layer 11, CoCrCe second perpendicular magnetic recording layer 12, C protective layer 13, and lubricating layer (not shown) are stacked in this order on a nonmagnetic substrate 1.

Subsequently, the magnetoresistance effect was used to evaluate the recording/reproduction characteristics by using a ring head having a recording track width of 0.3 μm and a reproduction track width of 0.2 μm. Consequently, the SNRm was 20 dB, indicating that the magnetic recording medium was excellent. Also, the waveform half width PW50 as an index of the resolution of a single layered perpendicular medium was 86 nm, and the decay value at a low-frequency output of 50 kFCI was −0.07%/decade.

Comparative Example 5

A perpendicular magnetic recording medium was obtained following the same procedure as in Example 9 except that a Co-20 at % Cr-16 at % Pt target was used to form a 24-nm thick CoCrPt layer as a first perpendicular magnetic recording layer on a nonmagnetic substrate, and no CoCrCe second perpendicular magnetic recording layer was formed.

The recording/reproduction characteristics of the obtained conventional perpendicular magnetic recording medium were evaluated in the same manner as in Example 9. As a consequence, the SNRm was 16.8 dB. Also, the PW50 was 102 nm, and the decay value at a low-frequency output of 50 kFCI was −0.13%/decade.

Additional advantages and modifications will readily occur to those skilled in the art. Therefore, the invention in its broader aspects is not limited to the specific details and representative embodiments shown and described herein. Accordingly, various modifications may be made without departing from the spirit and scope of the general inventive concept as defined by the appended claims and their equivalents.

What is claimed is:

1. A perpendicular magnetic recording medium comprising:
   a nonmagnetic substrate;
   a first perpendicular magnetic recording layer formed on the nonmagnetic substrate at room temperature, wherein the first perpendicular magnetic recording layer has an easy axis of magnetization in a vertical direction, and contains cobalt, oxygen, and at least one of platinum and chromium;
   a second perpendicular magnetic recording layer formed on the first perpendicular magnetic recording layer at room temperature, wherein the second perpendicular magnetic recording layer has an easy axis of magnetization in the vertical direction, and mainly contains a crystalline alloy, and the crystalline alloy consists essentially of cobalt, chromium, platinum, and optionally one or both tantalum and niobium, and at least one rare earth element selected from the group consisting of yttrium, lanthanum, cerium, praseodymium, neodymium, samarium, europium, gadolinium, terbium, dysprosium, holmium, thulium, ytterbiu and lutetium, and one of a lubricating layer and a protective layer.

2. A medium according to claim 1, which further comprises a soft magnetic backing layer between the nonmagnetic substrate and first perpendicular magnetic recording layer.

3. A medium according to claim 1, wherein the second perpendicular magnetic recording layer has a thickness of 0.1 (inclusive) to 20 (exclusive) nm.

4. A medium according to claim 3, wherein the second perpendicular magnetic recording layer has a thickness of 0.1 (inclusive) to 15 (inclusive) nm.

5. A medium according to claim 1, wherein the rare earth element is contained in an amount of 0.1 to 20 at % in the second perpendicular magnetic recording layer, and is at least one element selected from the group consisting of yttrium, lanthanum, cerium, samarium, europium, thulium, ytterbium, and lutetium.

6. A medium according to claim 1, wherein the second perpendicular magnetic recording layer contains at least one of tantalum and niobium.

7. A medium according to claim 1, which further comprises at least one magnetic layer between the first and second perpendicular magnetic recording layers, and/or on the second perpendicular magnetic recording layer.

8. A medium according to claim 7, which further comprises other first and second perpendicular magnetic recording layers stacked on the second perpendicular magnetic recording layer.

9. A medium according to claim 1, which further comprises at least one nonmagnetic undercoating between the nonmagnetic substrate and first perpendicular magnetic recording layer.

10. A magnetic recording/reproduction apparatus comprising a perpendicular magnetic recording medium, a mechanism which supports and rotates the perpendicular magnetic recording medium, a magnetic head having an element to record information on the perpendicular magnetic recording medium and an element to reproduce recorded information, and a carriage assembly which supports the magnetic head to be movable with respect to the perpendicular magnetic recording medium, wherein the perpendicular magnetic recording medium comprises:

a nonmagnetic substrate;

a first perpendicular magnetic recording layer formed on the nonmagnetic substrate at room temperature, having an easy axis of magnetization in a vertical direction, and containing cobalt, oxygen, and at least one of platinum and chromium;

a second perpendicular magnetic recording layer formed on the first perpendicular magnetic recording layer at room temperature, having an easy axis of magnetization in the vertical direction, and mainly containing a crystalline alloy, the crystalline alloy consisting essentially of cobalt, chromium, platinum, and optionally one or both tantalum and niobium, and at least one rare earth element selected from the group consisting of yttrium, lanthanum, cerium, praseodymium, neodymium, samarium, europium, gadolinium, terbium, dysprosium, holmium, thulium, ytterbium, and lutetium, and one of a lubricating layer and a protective layer.

11. A magnetic recording/reproduction apparatus according to claim 10, which further comprises a soft magnetic backing layer between the nonmagnetic substrate and first perpendicular magnetic recording layer.

12. A magnetic recording/reproduction apparatus according to claim 10, wherein the second perpendicular magnetic recording layer has a thickness of 0.1 (inclusive) to 20 (exclusive) nm.

13. A magnetic recording/reproduction apparatus according to claim 12, wherein the second perpendicular magnetic recording layer has a thickness of 0.1 (inclusive) to 15 (inclusive) nm.

14. A magnetic recording/reproduction apparatus according to claim 10, wherein the rare earth element is contained in an amount of 0.1 to 20 at % in the second perpendicular magnetic recording layer, and is at least one element selected from the group consisting of yttrium, lanthanum, cerium, samarium, europium, thulium, ytterbium, and lutetium.

15. A magnetic recording/reproduction apparatus according to claim 10, wherein the second perpendicular magnetic recording layer contains at least one of tantalum and niobium.

16. A magnetic recording/reproduction apparatus according to claim 10, which further comprises at least one magnetic layer between the first and second perpendicular magnetic recording layers, and/or on the second perpendicular magnetic recording layer.

17. A magnetic recording/reproduction apparatus according to claim 16, which further comprises other first and second perpendicular magnetic recording layers stacked on the second perpendicular magnetic recording layer.

18. A magnetic recording/reproduction apparatus according to claim 10, which further comprises at least one nonmagnetic undercoating between the nonmagnetic substrate and first perpendicular magnetic recording layer.

* * * * *